(12) United States Patent
Yu (10) Patent No.: US 9,894,563 B2
(45) Date of Patent: *Feb. 13, 2018

(54) PROCESSING CIRCUIT SWITCHED SERVICES IN AN EVOLVED PACKET NETWORK

(71) Applicant: Huawei Technologies Co., Ltd., Shenzhen (CN)

(72) Inventor: Yijun Yu, Shanghai (CN)

( * ) Notice: Subject to any disclaimer, the term of this patent is extended or adjusted under 35 U.S.C. 154(b) by 14 days.

This patent is subject to a terminal disclaimer.

(21) Appl. No.: 14/859,196

(22) Filed: Sep. 18, 2015

(65) Prior Publication Data

US 2016/0014643 A1 Jan. 14, 2016

Related U.S. Application Data

(63) Continuation of application No. 13/924,606, filed on Jun. 23, 2013, now Pat. No. 9,161,269, which is a (Continued)

(30) Foreign Application Priority Data

Jan. 16, 2008 (CN) .......................... 2008 1 0002762

(51) Int. Cl.
*H04W 36/00* (2009.01)
*H04W 24/02* (2009.01)
(Continued)

(52) U.S. Cl.
CPC ....... *H04W 36/0022* (2013.01); *H04W 24/02* (2013.01); *H04W 68/02* (2013.01); *H04W 76/027* (2013.01)

(58) Field of Classification Search
CPC ....... H04W 4/00; H04W 24/02; H04W 36/00; H04W 36/0022; H04W 68/02; (Continued)

(56) References Cited

U.S. PATENT DOCUMENTS 7,415,274 B2 8/2008 Kauranen et al.
7,885,234 B2 2/2011 Ejzak
(Continued)

FOREIGN PATENT DOCUMENTS

CN 1812601 A 8/2006
CN 101039507 A 9/2007
(Continued)

OTHER PUBLICATIONS

"3rd Generation Partnership Project; Technical Specification Group Services and System Aspects; General Packet Radio Service (GPRS); Service description; Stage 2 (Release 7)," 3GPP TS 23.060, V7.6.0, pp. 1-217, 3rd Generation Partnership Project, Valbonne, France (Dec. 2007).
(Continued)

*Primary Examiner* — Tri H Phan
(74) *Attorney, Agent, or Firm* — Huawei Technologies Co., Ltd.

(57) ABSTRACT

The present invention discloses for the ability for processing circuit switched (CS) services in an evolved packet network. For example, embodiments provide a method that includes: by a mobility management entity (MME), receiving a mobile terminated (MT) service indication from a mobile switching center (MSC); sending the MT service indication to user equipment (UE); and receiving an MT service response returned by the UE and performing subsequent operations according to the MT service response. In the method of the present invention, when an MT service arrives, the MME does not trigger the evolved NodeB (eNodeB) to hand over the packet switched (PS) services of the UE but notifies the UE of the MT service and performs subsequent operations according to the MT service response returned by the UE, thus avoiding the waste of network resources caused by a meaningless handover of PS services.

22 Claims, 6 Drawing Sheets

Related U.S. Application Data continuation of application No. 12/831,437, filed on Jul. 7, 2010, now Pat. No. 8,493,934, which is a continuation of application No. PCT/CN2007/073200, filed on Nov. 26, 2008.

(51) Int. Cl.
*H04W 68/02* (2009.01)
*H04W 76/02* (2009.01)

(58) Field of Classification Search
CPC ... H04W 72/02; H04W 76/02; H04W 76/027; H04L 12/28; H04L 12/66
See application file for complete search history.

(56) References Cited

U.S. PATENT DOCUMENTS

| | | | |
|---|---|---|---|
| 8,064,403 B2 | 11/2011 | Zhao et al. | |
| 8,189,604 B2* | 5/2012 | Rautiola | H04W 60/00 370/338 |
| 8,259,673 B2 | 9/2012 | Diachina et al. | |
| 8,284,701 B2 | 10/2012 | Vikberg et al. | |
| 8,320,291 B2 | 11/2012 | Rune et al. | |
| 8,391,241 B2 | 3/2013 | Vikberg et al. | |
| 8,493,934 B2* | 7/2013 | Yu | H04W 68/02 370/331 |
| 8,493,938 B2* | 7/2013 | Yu | H04W 68/02 370/331 |
| 8,494,536 B2 | 7/2013 | Noguchi et al. | |
| 8,504,043 B2 | 8/2013 | Wu et al. | |
| 8,861,496 B2 | 10/2014 | Yu et al. | |
| 9,049,677 B2* | 6/2015 | Yin | H04W 36/0022 |
| 9,161,269 B2* | 10/2015 | Yu | H04W 68/02 |
| 2003/0026245 A1 | 2/2003 | Ejzak | |
| 2004/0152466 A1 | 8/2004 | Sinnarajah et al. | |
| 2007/0207806 A1 | 9/2007 | Shaheen | |
| 2007/0218903 A1 | 9/2007 | Grech | |
| 2008/0214190 A1 | 9/2008 | Aalto | |
| 2008/0233947 A1 | 9/2008 | Herrero-Veron | |
| 2008/0274736 A1 | 11/2008 | Hu | |
| 2009/0036131 A1 | 2/2009 | Diachina et al. | |
| 2009/0238143 A1* | 9/2009 | Mukherjee | H04W 36/0022 370/331 |
| 2009/0258671 A1* | 10/2009 | Kekki | H04W 76/027 455/552.1 |
| 2010/0080171 A1* | 4/2010 | Rune | H04J 11/0069 370/328 |
| 2010/0172336 A1* | 7/2010 | Pehrsson | H04W 60/02 370/338 |
| 2010/0189035 A1 | 7/2010 | Pehrsson et al. | |
| 2010/0246530 A1* | 9/2010 | Pehrsson | H04W 36/0022 370/331 |
| 2010/0254313 A1* | 10/2010 | Hallenstal | H04L 29/12311 370/328 |
| 2010/0265884 A1* | 10/2010 | Vikberg | H04W 4/14 370/328 |
| 2010/0272025 A1* | 10/2010 | Yu | H04W 68/02 370/328 |
| 2010/0303007 A1 | 12/2010 | Witzel et al. | |
| 2010/0303041 A1 | 12/2010 | Diachina et al. | |
| 2011/0207481 A1 | 8/2011 | Yin et al. | |
| 2011/0249654 A1* | 10/2011 | Yu | H04W 36/0005 370/331 |
| 2011/0274046 A1 | 11/2011 | Rune et al. | |
| 2012/0122459 A1* | 5/2012 | Wu | H04W 36/0022 455/437 |
| 2012/0257600 A1 | 10/2012 | Diachina et al. | |
| 2012/0287907 A1* | 11/2012 | Yu | H04W 68/02 370/331 |
| 2013/0279476 A1* | 10/2013 | Yu | H04W 68/02 370/331 |

FOREIGN PATENT DOCUMENTS

| | | |
|---|---|---|
| CN | 101090567 A | 12/2007 |
| EP | 1081971 A1 | 3/2001 |
| EP | 2683133 A1 | 1/2014 |
| EP | 2683134 A1 | 1/2014 |
| JP | 2006516870 A | 7/2006 |
| JP | 2010516167 A | 5/2010 |
| JP | 2010531566 A | 9/2010 |
| JP | 2011508496 A | 3/2011 |
| WO | WO 2006077555 A1 | 7/2006 |
| WO | WO 2007137615 A1 | 12/2007 |
| WO | WO 2009000315 A1 | 12/2008 |
| WO | 2013/172656 A1 | 11/2013 |

OTHER PUBLICATIONS

"3$^{rd}$ Generation Partnership Project; Technical Specification Group Services and System Aspects; Circuit Switched Fallback in Evolved Packet System; Stage 2 (Release 8)," 3GPP TS 23.272, V1.1.0, pp. 1-25, 3$^{rd}$ Generation Partnership Project, Valbonne, France (Apr. 2008).

"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401, V8.0.0, pp. 1-167, 3$^{rd}$ Generation Partnership Project, Valbonne, France (Dec. 2007).

Notice of Allowance in corresponding U.S. Appl. No. 12/831,437 (dated Mar. 22, 2013).

First Office Action in corresponding U.S. Appl. No. 12/831,437 (dated Aug. 27, 2012).

Notice of Allowance in corresponding U.S. Appl. No. 13/557,033 (dated May 1, 2013).

First Office Action in corresponding U.S. Appl. No. 13/557,033 (dated Oct. 23, 2012).

Notice of Allowance in corresponding U.S. Appl. No. 13/924,606 (dated Jun. 5, 2015).

First Office Action in corresponding U.S. Appl. No. 13/924,606 (dated Dec. 10, 2014).

"CS Fallback: Overview and Open Issues," 3GPP TSG-RAN WG2, Seville, Spain, R2-080027, 3$^{rd}$ Generation Partnership Project, Valbonne, France (dated Jan. 14-18, 2008).

"Fallback from eUTRAN to 2G/3G access for CS Voice Services," 3GPP TSG SA WG2 Architecture—S2#57, Orlando, Florida, S2-072521, 3$^{rd}$ Generation Partnership Project, Valbonne, France (Jun. 25-29, 2007).

"3$^{rd}$ Generation Partnership Project; Technical Specification Group Services and System Aspects; Study on Circuit Switched (CS) domain services over evolved Packet Switched (PS) access; Stage 2 (Release 8)," 3GPP TR 23.879, V1.0.0, pp. 1-40, 3$^{rd}$ Generation Partnership Project, Valbonne, France (Dec. 2007).

* cited by examiner

PROCESSING CIRCUIT SWITCHED SERVICES IN AN EVOLVED PACKET NETWORK

CROSS-REFERENCE TO RELATED APPLICATIONS

This application is a continuation of U.S. patent application Ser. No. 13/924,606, filed on Jun. 23, 2013, which is a continuation of U.S. patent application Ser. No. 12/831,437, filed on Jul. 7, 2010, now U.S. Pat. No. 8,493,934, which is a continuation of International Patent Application No. PCT/CN2008/073200, filed on Nov. 26, 2008, which claims priority to Chinese Patent Application 200810002762.X, filed on Jan. 16, 2008. The afore-mentioned patent applications are hereby incorporated by reference in their entireties.

FIELD OF THE INVENTION

The present invention relates to communications technologies, and in particular, to processing circuit switched services in an evolved packet network.

BACKGROUND OF THE INVENTION

To answer the challenge of wireless broadband technologies and maintain the leadership of the $3^{rd}$ Generation Partnership Project (3GPP) networks, the 3GPP organization prepared a long term evolution (LTE) plan at the end of 2004. Directed by the LTE plan, new mobile communications network architecture is defined, where only the packet switched (PS) domain remains. The architecture is called an evolved packet system (EPS).

To enable circuit switched (CS) services in an EPS network, a prior art provides a method for processing CS services in an EPS network, which may be described as a CS fallback method.

When a mobile switching center (MSC) receives a mobile terminated (MT) service, such as a CS voice call, the MSC sends a page message to a mobility management entity (MME) and the MME pages user equipment (UE) via the EPS network. When an evolved NodeB (eNodeB) receives the page message, the eNodeB first executes a PS service handover, that is, the eNodeB hands over the ongoing PS service of the UE to the PS domain of a general packet radio service/universal mobile telecommunications system (GPRS/UMTS) network. Then, the eNodeB hands over the UE to a $2^{nd}$ generation/$3^{rd}$ generation (2G/3G) network, that is, the UE chooses a 2G/3G cell to camp. When the UE returns a page response to the MSC in the GPRS/UMTS network, the UE completes processing of the MT service.

During research and practice of the prior art, however, the inventor finds that the prior art has at least the following weaknesses:

By using the CS fallback method in the prior art, the eNodeB executes a PS service handover immediately when receiving the page message from the MME, which results in the following problems:

1. Waste of network resources. According to the prior art, when an MT service arrives, the eNodeB hands over the PS service to the PS domain of a 2G/3G network and connects the MT service. In practice, the following case often happens: When the UE is handed over to a 2G/3G network and an MT service is connected, the user rejects the MT service because the user is unwilling or unable to answer. The base station subsystem/radio network controller (BSC/RNC) regards such MT services as services that have been completed and the BSC/RNC then hands over the PS services of the UE to the EPS network. Two PS service handovers are performed for an MT service that is not normally executed, and therefore network resources are wasted.

2. Impact on the ongoing PS service of the UE. For example, a UE is in a PS service (such as a video conference) in an EPS network when it receives a CS MT service (such as a private call). According to the prior art, the eNodeB hands over the video conference to the PS domain a 2G/3G network, but because the PS domain of the 2G/3G network does not support certain PS services in the EPS network, such as the video conference, the PS service will fail. Thus, the prior art impacts the ongoing PS services.

SUMMARY OF THE INVENTION

Embodiments of the present invention provide a method, system and device for processing CS services in an evolved packet network so as to avoid the waste of network resources and not to impact the current PS services of a UE.

For the above purpose, the embodiments of the present invention are implemented via the following technical solution:

A method for processing CS services in an evolved packet network includes:

receiving, by an MME, an MT service indication from an MSC;

sending, by the MME, the MT service indication to a UE; and by the MME, receiving an MT service response returned by the UE and performing subsequent operations according to the MT service response.

A method for processing CS services in an evolved packet network includes:

receiving, by an MME, a short message from an MSC;

by the MME, sending the short message to a UE if the UE is in active mode and activating the UE and sending the short message to the UE if the UE is in idle mode; and receiving, by the MME, a short message response from the UE.

An MME includes:

a page message receiving unit, configured to receive an MT service indication from an MSC;

an MT service notifying unit, configured to send the MT service indication to a UE;

a response receiving unit, configured to receive an MT service response returned by the UE; and a response processing unit, configured to perform subsequent operations according to the MT service response.

An MME includes:

a receiving unit, configured to receive a short message from an MSC;

a state judging unit, configured to judge whether a UE is in active or idle mode;

a sending unit, configured to send the short message received by the receiving unit to the UE when the state judging unit determines that the UE is in active mode;

an activating and sending unit, configured to activate the UE when the state judging unit determines that the UE is in idle mode and send the short message received by the receiving unit to the activated UE; and a short message response receiving unit, configured to receive a short message response from the UE.

A UE includes:

a notification receiving unit, configured to receive an MT service indication sent by an MME;

an notifying unit, configured to notify the user of the MT service after the notification receiving unit receives the MT service indication; and a response sending unit, configured to return an MT service response to the MME according to a choice of the user regarding the MT service.

A system for processing CS services in an evolved packet network includes an MSC and an MME, where:

the MSC includes a service indication sending unit, configured to send an MT service indication to the MME after receiving the MT service indication;

the MME includes:

a page message receiving unit, configured to receive the MT service indication from the MSC;

an MT service notifying unit, configured to send the MT service indication to a UE;

a response receiving unit, configured to receive an MT service response returned by the UE; and a response processing unit, configured to perform subsequent operations according to the MT service response.

The technical solution provides the following benefits:

In the embodiments of the present invention, when a CS MT service arrives, the MME sends an MT service indication to notify the UE of the MT service and then performs subsequent operations according to an MT service response received from the UE. When the MT service arrives, the MME does not trigger the eNodeB to hand over the PS service of the UE, but notifies the UE of the MT service and carries out subsequent processing according to the MT service response returned by the UE. Thus, the embodiments of the present invention avoid the waste of network resources caused by a meaningless PS service handover and do not impact the ongoing PS services of the UE.

DETAILED DESCRIPTION OF THE INVENTION

To better explain the purpose, technical solution and advantages of the present invention, the embodiments of the present invention are hereinafter described in detail with reference to the accompanying drawings.

Figure 1:
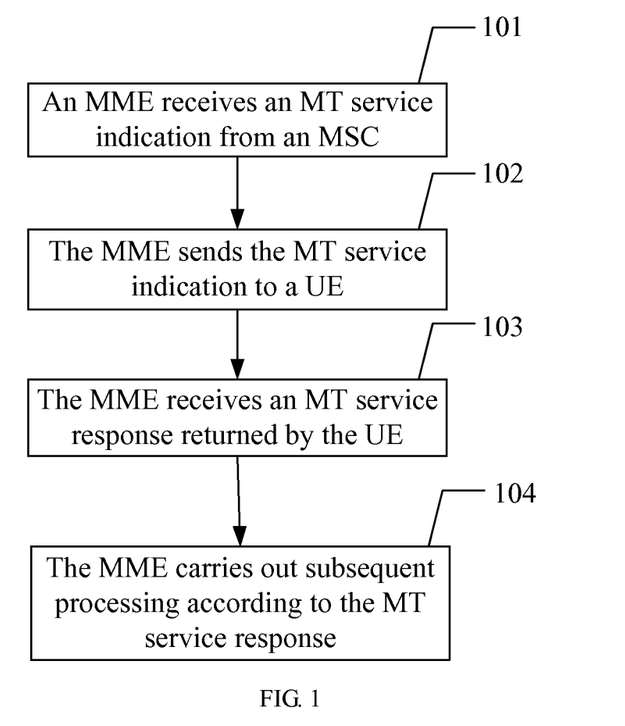
FIG. 1 is a flowchart of a CS fallback method provided in an embodiment of the present invention.

When a circuit switched (CS) mobile terminated (MT) service arrives, as shown in FIG. 1, a CS fallback method provided in an embodiment of the present invention includes:

Step 101: A mobility management entity (MME) receives an MT service indication from an mobile switching center (MSC).

Step 102: The MME forwards the MT service indication to a user's equipment (UE).

The MT service indication notifies the UE of an MT service.

Step 103: The MME receives an MT service response from the UE.

Step 104: The MME carries out subsequent processing according to the MT service response.

The above is a CS fallback method provided in an embodiment of the present invention. In the embodiment, when a CS MT service arrives, the MME first sends an MT service indication to notify the UE of the MT service and after reception of the MT service response from the UE, the MME carries out subsequent processing according to the MT service response. In the method provided in the embodiment of the present invention, when an MT service arrives, the MME does not trigger the eNodeB to hand over the PS service of the UE, but notifies the UE of the MT service and carries out subsequent processing according to the MT service response returned by the UE. Thus, the method avoids the waste of network resources caused by a meaningless PS service handover and does not impact the ongoing PS service of the UE.

In a specific implementation of the embodiment of the present invention, the MT service response may carry a user choice result. If the use chooses to reject the MT service, the MME returns an MT service Reject message to the MSC when the MME carries out subsequent processing according to the MT service response.

If the user chooses to accept the MT service, the MME sends a PS service handover request to the eNodeB and the eNodeB executes a PS service handover when the eNodeB receives the handover request and hands the UE over to a 2G/3G network. After the UE is handed over to the 2G/3G network, the UE sends a first page response to the MSC and completes MT service processing.

In another embodiment of the present invention, if the user chooses to accept the MT service, the MME does not hand over the current PS service of the UE according to a configured network operation policy and therefore, the MME does not need to send a PS service handover request to the eNodeB and the eNodeB does not need to execute a PS handover later. In this case, after the UE sends the response indicating acceptance of the MT service, or receives a response from the MME regarding the UE's acceptance of the MT service, the UE accesses the 2G/3G network directly to complete the MT service processing.

The above describes the CS fallback method provided in an embodiment of the present invention. The following describes specific signaling flows of the method.

Figure 2:
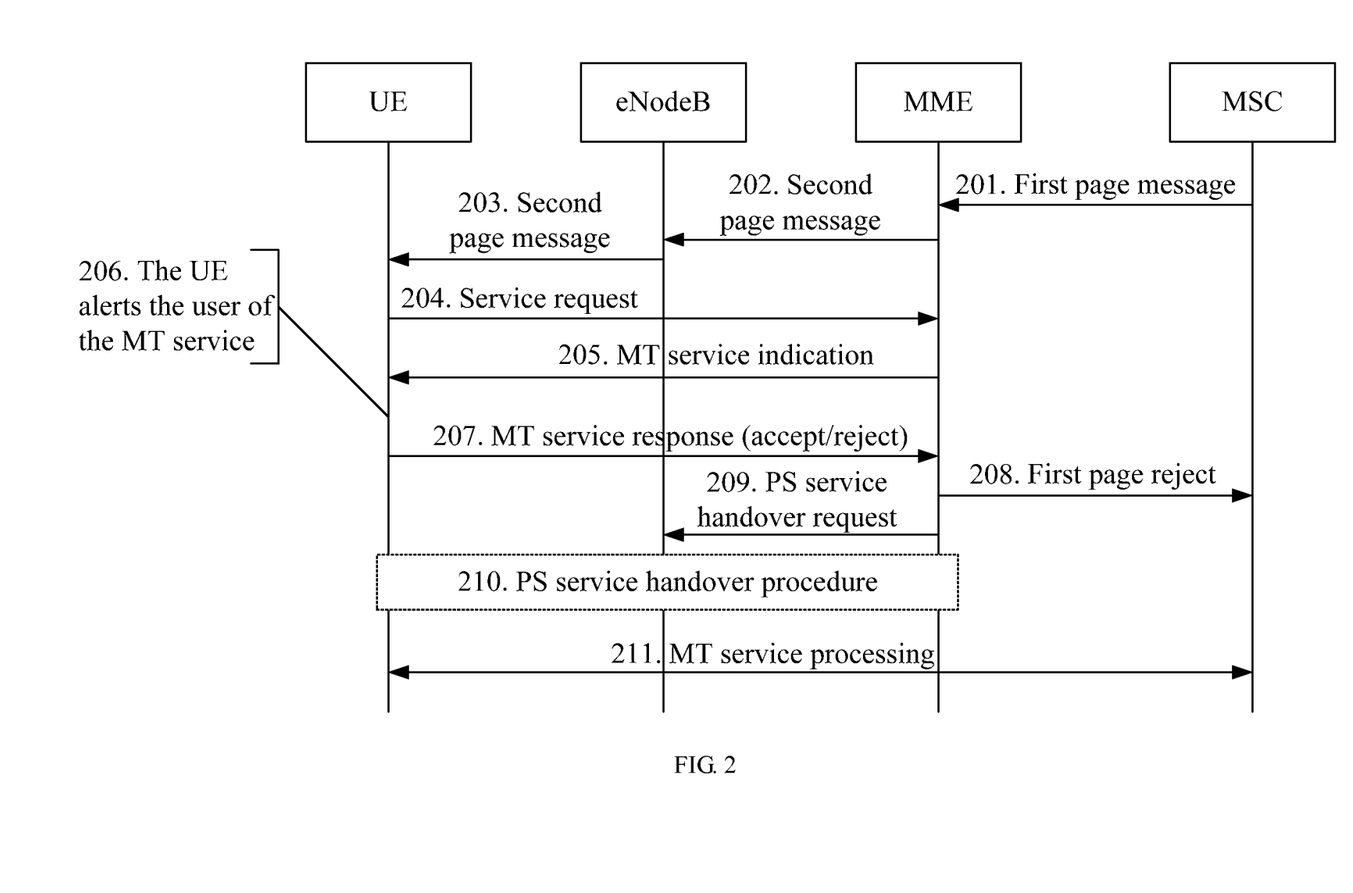
FIG. 2 is a signaling flow of a CS fallback method provided in Embodiment 1 of the present invention.

As shown in FIG. 2, a signaling flow of the CS fallback method in Embodiment 1 of the present invention includes:

Step 201: The MSC receives an MT service indication and sends a first page message to the MME.

In practice, the first page message may carry an international mobile subscriber identity (IMSI) of the UE.

Step 202: When receiving the first page message, the MME queries the UE state. If the UE is in idle mode, the MME sends a second page message to the eNodeB. If the UE is in active mode, the process proceeds to step 205.

In practice, the first page message may carry the MT service indication sent by the MSC to the MME. Therefore, the first page message may be named MT service request or alike. In addition, if the first page message carries the MT service indication, in step 302, after the MME receives the first page message, the MME needs to parse the first page message and query the UE state after the MT service indication is obtained.

In addition, the first page message may not carry the MT service indication. In this case, the MME is set to query the UE state once it receives the first page message. In this case, the first page message is equivalent to an MT service indication.

Step 203: The eNodeB broadcasts the second page message in the cell it manages.

Step 204: The UE receives the second page message and returns a service request to the MME.

The MME sends the second page message via the eNodeB to activate the idle UE.

Step 205: After receiving of the service request, the MME sends an MT service indication to the UE. The MT service indication is intended to notify the UE of the MT service.

The MT service indication shown in FIG. 2 is a non access stratum (NAS) message and therefore it may be sent to the UE directly from the MME. In another embodiment of the present invention, the MT service indication is an access stratum message (such as Page). The access stratum message may carry the MT service indication and is sent by the MME to the eNodeB and forwarded by the eNodeB to the UE. This does not impact the implementation of the present invention.

Step 206: After the UE receives the MT service indication, the UE notifies the user of the MT service.

In practice, the UE notifies the user of the MT service according to the presetting of the user. For example, the UE may ring, or vibrate, or ring and vibrate, or give a text notify, to notify the user of the MT service.

After the user makes a choice regarding the MT service, the UE executes step 207.

Step 207: The UE sends an MT service response to the MME.

The MT service response may carry the user choice result (accept or reject) or the MT service response does not carry a user choice result, that is, the user choice result is null. If the MT service response does not carry a user choice result, the MME may decide the user choice according to default settings. A common scenario is that, if the MT service response does not carry the choice result, the MME thinks that the user accepts the MT service by default.

Step 208: The MME obtains the choice result carried in the MT service response. If the user chooses to reject the MT service, the MME sends a first page reject message (the foregoing MT service reject). If the user chooses to accept the MT service, the process proceeds to step 209.

If the UE rejects the MT service, it is unnecessary to execute the MT service and the MME returns a first page reject message to the MSC to end the MT service. In the method provided in the embodiment of the present invention, if the UE does not execute the MT service, the eNodeB does not hand over the PS service of the UE. Thus the method avoids the waste of network resources caused by a meaningless PS handover and will not impact the current PS service of the UE.

The first page reject message may carry a cause value indicating the reason for rejecting the MT service or the message may not carry the cause value. Whether the message carries the cause value does not impact the implementation of the present invention.

In addition, the case often happens in daily life that the user does not see or feel the notifying of the UE in a long time. To improve the work efficiency of the MME, it may be defined in advance that, if the MME does not receive the MT service response from the UE within a preset time T, the MME thinks that the user rejects the MT service. And in this case, the MME sends the first page reject message to the MSC to reject the MT service.

Step 209: The MME sends a PS service handover request to the eNodeB.

Step 210: The eNodeB receives the PS service handover request and initiates a PS service handover procedure to hand the UE over to the 2G/3G network.

Step 211: After the UE is handed over to the 2G/3G network, the UE sends a first page response and completes the MT service processing.

In another embodiment of the present invention, after the MME receives the first page message, the MME may not query the UE state but thinks the UE is in idle mode by default. Then, the MME sends a second page message and an MT service indication to the UE to notify the active or idle UE of the MT service.

Figure 3:
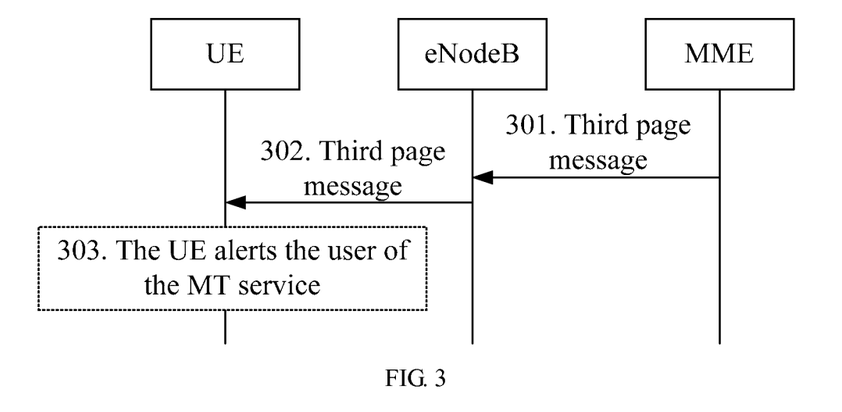
FIG. 3 is a signaling flow where a UE is activated and notified of an incoming MT service in Embodiment 1 of the present invention.

The above is a signaling flow provided in Embodiment 1 of the present invention. When the MME receives the first page message sent by the MSC in step 201, the MME may notify an idle or active UE of the MT service via steps 202-205 in Embodiment 1 of the present invention or via the signaling flow shown in FIG. 3. The signaling flow includes:

Step 301: The MME receives a first page message from the MSC and sends a third page message to the eNodeB. The third page message carries at least an MT service indication.

In practice, the MT service indication may be a page cause value in the third page message or an independent information element in the third page message, which will not impact the implementation of the present invention.

Step 302: The eNodeB broadcasts the third page message in the cell it manages.

Step 303: After the UE receives the third page message, the UE notifies the user of the MT service.

The signaling flow shown in FIG. 3 is different from steps 202-205 in Embodiment 1 of the present invention in the following aspects:

In Embodiment 1 of the present invention, the MME sends a message to notify the UE of an MT service only when the UE is in active mode. The UE may be already in active mode when the MME receives the first page message, or the UE may be activated through paging by the MME. In the signaling flow shown in FIG. 3, however, the MME does not check whether the UE is in active mode but notifies the UE of an MT service directly via a third page message.

Specifically, in Embodiment 1 of the present invention, when the UE is in idle mode, the MME sends the second page message and the MT service indication to notify the UE of the MT service; when the UE is in active mode, the MME sends the MT service indication directly to notify the UE of the MT service. The benefit of this signaling flow is that it does not impact the paging mechanism in the existing EPS network.

In the signaling flow shown in FIG. 3, the MME sends a third page message that carries the MT service indication to notify the UE of the MT service. The benefit is that it increases the processing efficiency of the MME and reduces the call delay.

To let the UE know information of the MT service originator to help the user make a choice regarding the MT service, in the preceding and following embodiments of the present invention, the first page message sent by the MSC to the MME may further carry MT service related information.

The MT service related information includes: a mobile station ISDN (MSISDN) of the originator, or a service type indication, such as short message service (SMS), location service (LCS), and unstructured supplementary service data (USSD). In addition, to help the MSC determine the MT service associated with the received MT service response, the MT service related information may further include an MT service ID that is allocated by the MSC or an existing ID (like a call number).

Because the first page message sent by the MSC to the MME carries the MT service related information, the page message or MT service indication sent by the MME to the UE may further carry the MT service related information. In this case, the UE notifies the user of the MT service according to the received MT service related information according to the presetting of the user. For example, the UE may display the MSISDN of the originator to the user or notify the user of the service type.

In the foregoing method, the user may choose to accept or reject the service. In certain scenarios, however, the user wishes to process the MT service after waiting for some time. It is therefore necessary to hold the MT service. Embodiment 2 of the present invention provides another CS fallback method. The method includes the following step based on the method shown in FIG. 1:

If the user chooses to hold the MT service, the MME sends an MT service Hold message to the MSC.

In addition, to guarantee that the MT service is restorable, the method further includes:

If the UE requests restoration of the held MT service, the MME notifies the MSC to restore the MT service; the MSC judges whether the MT service can be restored and if the service can be restored, the MSC notifies the UE of accessing the 2G/3G network via the MME and the UE then completes the MT service, or the MME triggers the eNodeB to hand the UE over to the 2G/3G network to complete the MT service according to a configured operation policy. If the MSC cannot restore the MT service, the restoration procedure is ended.

Figure 4:
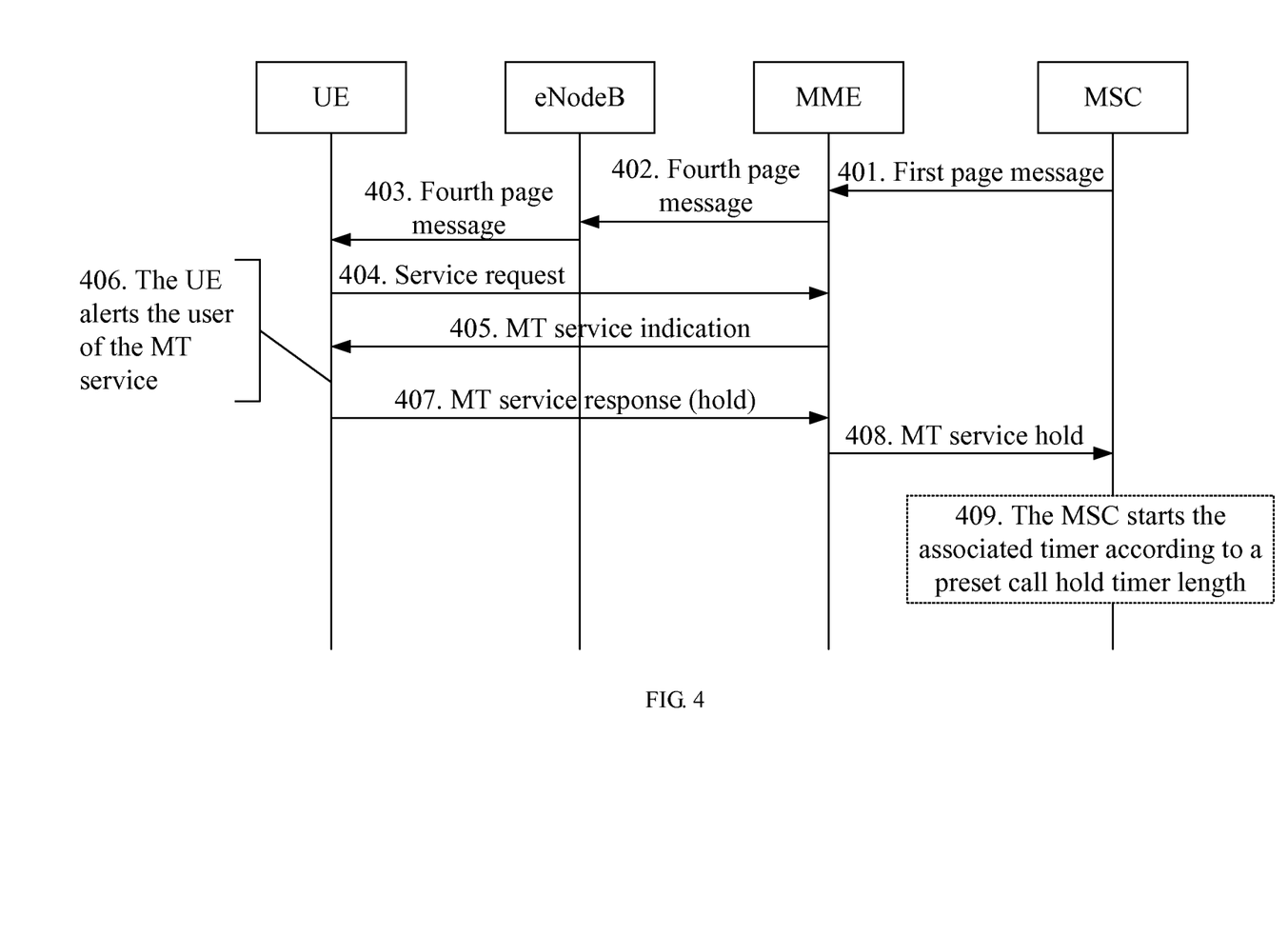
FIG. 4 is a signaling flow of a CS fallback method provided in Embodiment 2 of the present invention.

FIG. 4 shows a signaling flow of the CS fallback method in Embodiment 2 of the present invention. The signaling flow allows the user to choose to hold the MT service. The signaling flow includes:

Step 401: The MSC receives an MT service request and sends a first page message to the MME.

To avoid long-term MT service holding that consumes system resources, the method may further include a step of presetting a call hold timer and the first page message further carries the call hold timer length.

Step 402: The MME queries the state of the UE associated with the IMSI. If the UE is in idle mode, the MME sends a fourth page message to the eNodeB. If the UE is in active mode, the process proceeds to step 405.

Step 403: The eNodeB broadcasts the fourth page message in the cell it manages.

Step 404: The UE receives the fourth page message and returns a service request to the MME.

Step 405: The MME sends an MT service indication to the UE to notify the UE of an MT service.

The ME service indication may or may not carry the MT service related information and/or the call hold timer length, which does not impact the implementation of the present invention.

Step 406: After the UE receives the MT service indication, the UE notifies the user of the MT service.

In practice, if the MT service indication carries the MT service related information, the UE notifies the user of the MT service according to the received MT service related information according to the presetting of the user. For example, the UE may display the MSISDN of the originator to the user or notify the user of the service type. The UE may ring, or vibrate, or ring and vibrate, or give a text notify to notify the user of the MT service.

After the user makes a choice regarding the MT service, the UE executes step 407.

Step 407: The UE sends an MT service response to the MME.

The MT service response may carry the user choice result (accept or reject) or the MT service response does not carry a user choice result, that is, the user choice result is null. If the MT service response does not carry a user choice result, the MME may decide the user choice according to default settings. A common scenario is that, if the MT service response does not carry the choice result, the MME thinks that the user accepts the MT service by default.

If the user chooses to hold the service, the UE starts the associated timer according to the call hold timer length.

Step 408: The MME obtains the choice result carried in the MT service response. If the user chooses to hold the MT service, the MME sends an MT service Hold message to the MSC; if the user chooses to reject or accept the MT service, the subsequent steps are the same as the procedure provided in Embodiment 1 of the present invention.

Step 409: The MSC starts the associated timer according to the preset call hold timer length.

In another embodiment of the present invention, after the MME receives the first page message, the MME may not query the UE state but thinks the UE is in idle mode by default. Then, the MME sends the fourth page message and the MT service indication to the UE to notify the active or idle UE of the MT service.

Figure 5:
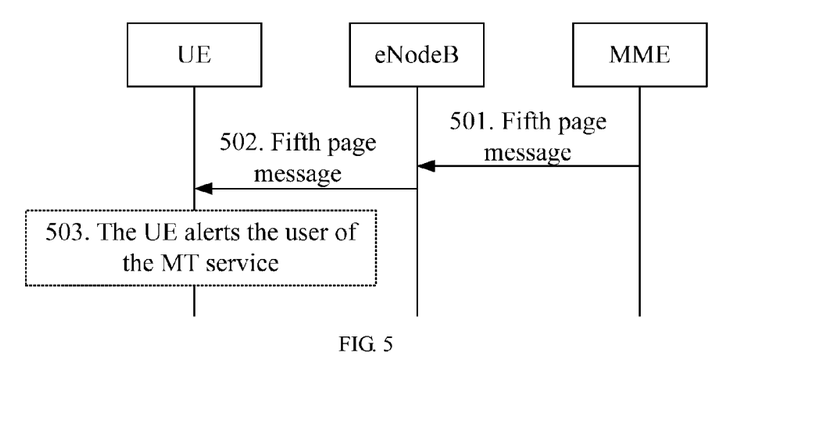
FIG. 5 is a signaling flow where a UE is activated and notified of an incoming MT service in Embodiment 2 of the present invention.

The above is a specific signaling flow of the CS fallback method provided in Embodiment 2 of the present invention. The active or idle UE may be notified of the MT service via steps 402-405. In another embodiment of the present invention, the signaling flow shown in FIG. 5 may be adopted to notify an active or idle UE of an MT service. The signaling flow includes:

Step 501: The MME receives a first page message from the MSC and sends a fifth page message to the eNodeB. The fifth page message carries at least an MT service indication.

To avoid long-term MT service holding that consumes system resources and help the user make a choice regarding the MT service, the MT service request may further carry a preset call hold timer length and/or MT service related information.

Step 502: The eNodeB broadcasts the fifth page message in the cell it manages.

Step 503: After the UE receives the fifth page message, the UE notify the user of the MT service.

The CS fallback method provided in the embodiments of the present invention and the specific implementation procedures are described above.

Figure 6:
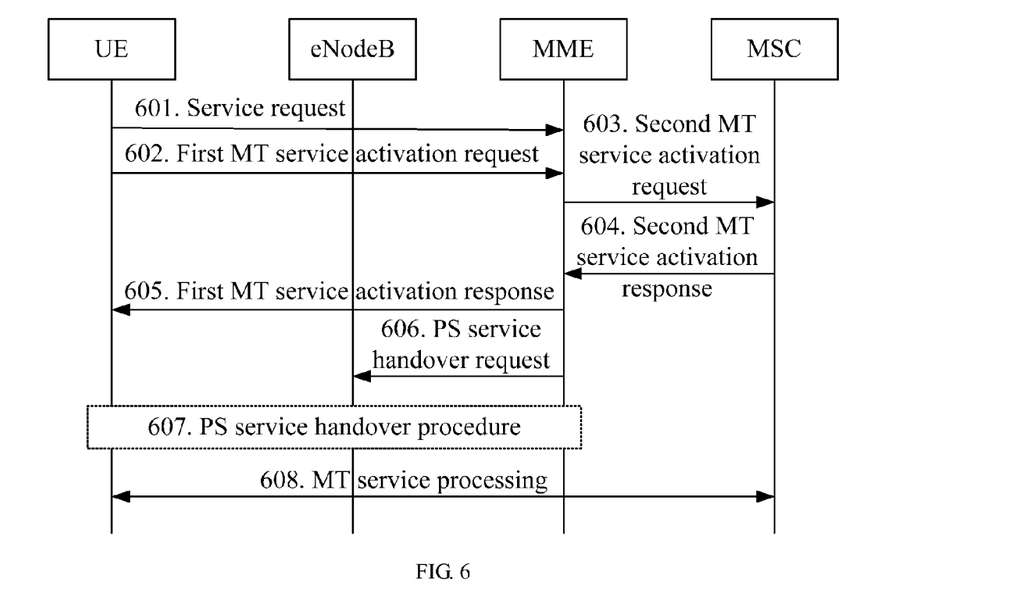
FIG. 6 is a signaling flow of an MT service restoring method provided in an embodiment of the present invention.

For a user-held MT service, if the user chooses to continue the service, the MT service needs to be restored. When the user requests restoration of the MT service, if the UE starts a timer when the MT service is held, the UE needs to check whether the timer has expired. If the timer has expired, the restoration procedure is over. If the timer has not expired, the restoration procedure is executed. With respect to the above MT service restoration procedure, an embodiment of the present invention provides a signaling flow for MT service restoration. As shown in FIG. 6, the signaling flow includes:

Step 601: If the UE is currently in idle mode, the UE sends a service request to the MME. When the UE becomes active from the idle mode, step 602 is executed. If the UE is in active mode, step 602 is executed directly.

Step 602: The UE sends a first MT service activation request to the MME, requesting to restore the held MT service.

The MT service activation request may carry the ID of the MT service to be activated so that the MME can determine the MT service. In certain scenarios (if the UE holds only one service), the MT service ID may not be carried, which does not impact the implementation of the present invention.

Step 603: The MME sends a second MT service activation request to the MSC.

Step 604: After the MSC receives the second MT service activation request, the MSC matches the MT service ID with the held MT service. If the service exists, the MSC accepts the activation request, stops the call hold timer, allocates the requested resource, and sends a second MT service activation response to the MME. The second MT service activation response carries a cause value of the successful operation. Otherwise, the MSC rejects the activation request and sends a second MT service activation response to the MME. The second MT service activation response carries a cause value of the failed operation.

In addition, if the call hold timer in the MSC expires, the MSC stops holding the MT service, releases the held resource, and stops the timer.

Optionally, different response messages may be sent to the MME in the scenarios of success and failure. The response message may also carry the MT service ID to help the UE determine the MT service.

Step 605: When the MME receives the second MT service activation response, the MME may send a first MT service activation response to the UE.

The first MT service activation response may carry the MT service ID carried in the second MT service activation response. Alternatively, the MME may not send the first MT service activation response and the implementation of the present invention will not be impacted.

Step 606: The MME sends a PS service handover request to the eNodeB.

In practice, the MME may proceed without handing over the current PS service of the UE according to the configured network operation policy and therefore the MME does not need to send a PS service handover request to the eNodeB and the eNodeB does not need to execute the PS handover procedure.

Step 607: The eNodeB receives the PS service handover request and initiates a PS service handover procedure to hand the UE over to the 2G/3G network.

Step 608: After the UE is handed over to the 2G/3G network, the UE sends the first page response and completes the MT service processing.

The above describes the CS fallback method provided in the embodiments of the present invention. In the CS fallback scenario, an SMS MT service may be sent to the UE via signaling of the UE in the EPS network without the need to hand over the UE to a 2G/3G network. For example, the first page message may carry the short message content and then the short message is sent to the UE via the EPS network. The UE receives the short message and completes related processing.

Those skilled in the art may understand that all or part of the steps of the method in the above embodiments of the present invention may be implemented by hardware under instructions of a program. The program may be stored in a computer-readable storage medium. When the program is executed, the following steps are performed:

by an MME, receiving an MT service indication from an MSC;

sending the MT service indication to a UE; and receiving an MT service response returned by the UE and performing subsequent operations according to the MT service response.

The storage medium may be a read-only memory, a magnetic disk or a compact disk.

Figure 7:
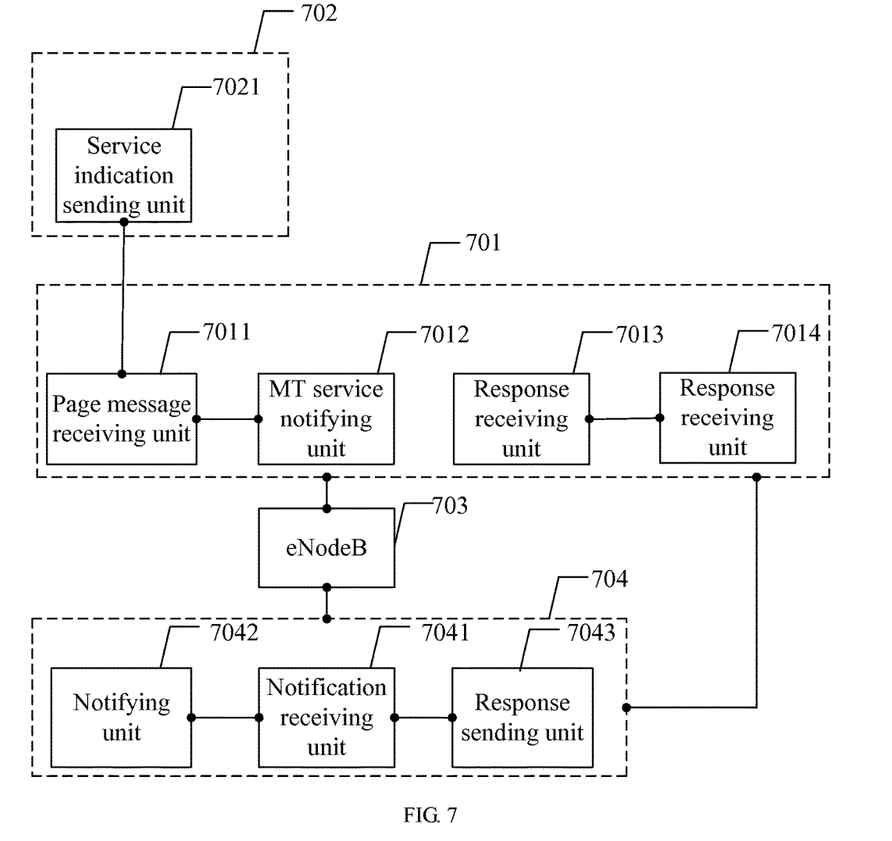
FIG. 7 shows a structure of a CS fallback system provided in an embodiment of the present invention.

FIG. 7 shows a CS fallback system provided in an embodiment of the present invention. The system includes: an MME 701, an MSC 702, and an eNodeB 703.

The MSC 702 includes a service indication sending unit 7021.

The service indication sending unit 7021 is configured to send an MT service indication to the MME 701 after receiving the MT service indication.

The MME 701 provided in the embodiment of the present invention includes:

a page message receiving unit 7011, configured to receive the MT service indication from the MSC 702;

an MT service notifying unit 7012, configured to send the MT service indication to a UE 704;

a response receiving unit 7013, configured to receive the MT service response returned by the UE 704; and a response processing unit 7014, configured to perform subsequent operations according to the MT service response.

In practice, the MT service response carries a user choice result and the response processing unit 7014 includes:

a first response processing unit, configured to return an MT service Reject message to the MSC 702 if the user chooses to reject the MT service;

a second response processing unit, configured to return an MT service Hold message to the MSC 702 if the user chooses to hold the MT service; and a third response processing unit, configured to trigger the UE 704 to access a 2G/3G network if the user chooses to accept the MT service or if the user choice result is null.

To enable the UE to restore the held MT service, the MME 701 further includes:

an activation request receiving unit, configured to receive a first MT service activation request sent by the UE 704, requesting to restore the held MT service;

an activation request sending unit, configured to send a second MT service activation request to the MSC 702; and an activation response receiving unit, configured to receive a second MT service activation response returned by the MSC 702 and indicates to the UE 704 that the UE 704 should access the 2G/3G network.

The MSC 702 further includes:

an activation request receiving unit, configured to receive the second MT service activation request from the MME; and an activation response sending unit, configured to return the second MT service activation response after the activation request receiving unit receives the request.

Because some UEs are in idle mode in the EPS network, to activate the UEs, the MT service notifying unit 7012 includes:

a UE activating unit, configured to activate the UE 704 via the eNodeB 703;

a state querying unit, configured to: query the state of the UE 704, and trigger a sending unit if the UE 704 is in active mode, or trigger the UE activating unit if the UE 704 is in idle mode; and the sending unit, configured to send the MT service indication to the UE 704 if the UE 704 is in active mode.

In practice, the UE activating unit has two implementations.

In the first implementation, the unit includes:

a page message sending unit, configured to send a second page message to the eNodeB 703; and a service request receiving unit, configured to trigger the MT service notifying unit 7012 after receiving the service request returned by the UE 704.

In the second implementation, the UE activating unit is an activating and notifying unit.

The activating and notifying unit is configured to send a third page message that carries an MT service indication to the eNodeB 703. By sending the third page message to the eNodeB 703, the UE is activated and the MT service indication is sent to the UE.

An embodiment of the present invention provides an MME for processing of the SMS MT service in a CS fallback scenario. The MME may include:

a receiving unit, configured to receive a short message from an MSC;

a state judging unit, configured to judge whether a UE is in active or idle mode;

a sending unit, configured to send the short message received by the receiving unit to the UE when the state judging unit determines that the UE is in active mode;

an activating and sending unit, configured to activate the UE when the state judging unit determines that the UE is in idle mode and send the short message received by the receiving unit to the activated UE; and a short message response receiving unit, configured to receive a short message response from the UE.

The activating and sending unit may include:

a page sending unit, configured to send a second page message to the eNodeB;

a returned message receiving unit, configured to receive a service request returned by the UE; and a short message sending unit, configured to send the short message to the UE according to the service request received by the returned message receiving unit.

Or, the activating and sending unit may include:

a page sending unit, configured to send a third page message that carries the short message to the eNodeB.

FIG. 7 shows the UE 704 provided in an embodiment of the present invention. The UE 704 includes:

a notification receiving unit 7041, configured to receive the MT service indication sent by the MME 701;

an notifying unit 7042, configured to notify the user of the MT service after the notification receiving unit 7041 receives the MT service indication; and a response sending unit 7043, configured to return an MT service response to the MME according to the choice of the user regarding the MT service.

To make the held MT service restorable, the UE may further include:

an activation request sending unit, configured to send a first MT service activation request to the MME, requesting to restore the held MT service.

Further, the UE may include an MT service processing unit, configured to process the MT service.

Although the present invention has been described through several exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the following claims or their equivalents.

What is claimed is:

1. A non-transitory computer readable medium storing instructions that, when executed by a computer processor, cause the processor to perform the steps of:
   receive information of a mobile terminated (MT) service from a mobile switching center (MSC), wherein the MT service is a circuit switched (CS) service;
   send a message to a user equipment device (UE) in an evolved packet system (EPS) network to notify the UE of the MT service;
   receive from the UE a MT service response; and
   perform one or more subsequent operations according to the MT service response, wherein the MT service response indicates whether to accept the MT service, or reject the MT service.

2. The non-transitory computer readable medium of claim 1, wherein perform one or more subsequent operations according to the MT service response comprises:
   if the MT service response indicates to reject the MT service, return an MT service reject message to the MSC.

3. The non-transitory computer readable medium of claim 1, wherein perform one or more subsequent operations according to the MT service response comprises:
   if the MT service response indicates to accept the MT service, trigger a process for the UE to access a 2nd generation or 3rd generation (2G/3G) network.

4. The non-transitory computer readable medium of claim 3 wherein trigger the process for the UE to access the 2G/3G network comprises:
   send a packet switched (PS) service handover request to an evolved NodeB (eNodeB) to request the eNodeB to hand the UE over to the 2G/3G network from the EPS network.

5. The non-transitory computer readable medium of claim 1, wherein the message sent to the UE to notify the UE of the MT service comprises information of the MT service, and the information of the MT service comprises one of the following: (1) a mobile station ISDN (MSISDN) of an originator, (2) a service type indication, or (3) the MSISDN of the originator and the service type indication.

6. The non-transitory computer readable medium of claim 5, wherein the information of the MT service further comprises an MT service ID.

7. The non-transitory computer readable medium of claim 1, wherein the MT service response received from the UE comprises a choice of a user of the UE indicating to accept the MT service or reject the MT service.

8. The non-transitory computer readable medium of claim 1, wherein receive the information of the MT service from the MSC comprises:
   receive, from the MSC, a first page message, wherein the first page message comprises the information of the MT service.

9. The non-transitory computer readable medium of claim 8, wherein the first page message further comprises an international mobile subscriber identity (IMSI) of the UE.

10. The non-transitory computer readable medium of claim 1 wherein the processor executes the instructions to perform the steps of:
    query a state of the UE; and
    determine that the UE is in an active mode;
    wherein send the message to the UE to notify the UE of the MT service comprises:
       based on the active mode of the UE, send the message to the UE to notify the UE of the MT service.

11. The non-transitory computer readable medium of claim 1 wherein the processor executes the instructions to perform the steps of:
query a state of the UE;
determine that the UE is in an idle mode state; and
activate the UE via an eNodeB;
wherein send the message to the UE to notify the UE of the MT service comprises:
based on the active mode of the UE, send the message to the UE to notify the UE of the MT service.

12. The non-transitory computer readable medium of claim 11, wherein activate the UE via the eNodeB comprises:
send a page message to the eNodeB, which broadcasts the page message to UEs in a cell managed by the eNodeB;
receive a service request returned by the UE.

13. A non-transitory computer readable medium storing instructions that, when executed by a computer processor, will cause the processor to perform the steps of:
receive a message notifying a mobile terminated (MT) service sent by a mobility management entity (MME), wherein the MT service is a circuit switched (CS) service; and
send an MT service response to the MME, wherein the MT service response indicates to accept the MT service, or reject the MT service.

14. The non-transitory computer readable medium of claim 13 wherein the processor executes the instructions to perform the steps of:
notify the MT service to a user of the User Equipment Device (UE) after receiving the message from the MME; and
obtain a choice from the user regarding the MT service;
wherein send the MT service response to the MME comprises sending the MT service response to the MME according to the choice of the user regarding the MT service.

15. The non-transitory computer readable medium of claim 13 wherein the processor executes the instructions to perform the steps of:
process the MT service after having been handed over from the EPS network to a 2nd generation or 3rd generation (2G/3G) network.

16. The non-transitory computer readable medium of claim 13, wherein the message comprises information of the MT service, and the information of the MT service comprises one of the following: (1) a mobile station ISDN (MSISDN) of an originator, (2) a service type indication, or (3) the MSISDN of the originator and the service type indication.

17. The non-transitory computer readable medium of claim 16, wherein the information of the MT service further comprises an MT service ID.

18. An apparatus comprising:
a receiving unit, configured to receive a message notifying the apparatus of a mobile terminated (MT) service from a mobility management entity (MME), wherein the MT service is a circuit switched (CS) service; and
a sending unit, configured to return an MT service response to the MME, wherein the MT service response indicates to accept the MT service, or reject the MT service.

19. The apparatus of claim 18, further comprising:
a user interfacing unit, configured to notify a user of the apparatus after the receiving unit receives the message and obtain user input indicating a choice regarding the MT service; and
wherein the transmitting unit returns the MT service response to the MME according to the choice regarding the MT service.

20. The apparatus of claim 19, further comprising:
a processing unit, configured to process the MT service after having been handed over from the EPS network to a 2nd generation or 3rd generation (2G/3G) network.

21. The apparatus of claim 18, wherein the message comprises information of the MT service, and the information of the MT service comprises one of the following: (1) a mobile station ISDN (MSISDN) of an originator, (2) a service type indication, or (3) the MSISDN of the originator and the service type indication.

22. The apparatus of claim 21, wherein the information of the MT service further comprises an MT service ID.

* * * * *

UNITED STATES PATENT AND TRADEMARK OFFICE
CERTIFICATE OF CORRECTION

| | |
|---|---|
| PATENT NO. | : 9,894,563 B2 |
| APPLICATION NO. | : 14/859196 |
| DATED | : February 13, 2018 |
| INVENTOR(S) | : Yijun Yu |

It is certified that error appears in the above-identified patent and that said Letters Patent is hereby corrected as shown below:

On the Title Page

After (72), add --(73) Assignee: Huawei Technologies Co., Ltd., Shenzhen (CN)--; and On page 2, item (56), under Related U.S. Application Data, delete "PCT/CN2007/073200" and insert therein --PCT/CN2008/073200--.

Signed and Sealed this
Second Day of October, 2018

Andrei Iancu
*Director of the United States Patent and Trademark Office*